(12) United States Patent
King

(10) Patent No.: US 11,505,048 B2
(45) Date of Patent: Nov. 22, 2022

(54) TONNEAU COVER LIFT

(71) Applicant: Jeffrey King, Boulder City, NV (US)

(72) Inventor: Jeffrey King, Boulder City, NV (US)

( * ) Notice: Subject to any disclaimer, the term of this patent is extended or adjusted under 35 U.S.C. 154(b) by 56 days.

(21) Appl. No.: 17/139,998

(22) Filed: Jan. 1, 2021

(65) Prior Publication Data

US 2022/0212525 A1 Jul. 7, 2022

(51) Int. Cl.
| | | |
|---|---|---|
| *B60J 7/14* | (2006.01) | |
| *B60J 7/16* | (2006.01) | |
| *B60J 7/12* | (2006.01) | |
| *B60P 7/04* | (2006.01) | |

(52) U.S. Cl.
CPC ............. *B60J 7/141* (2013.01); *B60J 7/1204* (2013.01); *B60J 7/1614* (2013.01); *B60P 7/04* (2013.01)

(58) Field of Classification Search
CPC ..... B60J 7/106; B60J 7/14; B60J 7/141; B60J 7/16; B60J 7/1607; B60J 7/1614; B60P 7/04
USPC ........................................ 296/100.02, 100.17
See application file for complete search history.

(56) References Cited

U.S. PATENT DOCUMENTS

| | | | |
|---|---|---|---|
| 8,186,739 B2 * | 5/2012 | Bruestle ................ | B60J 7/1614 296/100.01 |
| 10,046,628 B1 * | 8/2018 | Fulton ...................... | B60P 3/42 |
| 10,538,151 B2 * | 1/2020 | Sullivan .................... | B60J 7/12 |
| 11,024,139 B1 * | 6/2021 | Van Wiemeersch ........ B60R 25/1004 | |
| 2004/0164578 A1 * | 8/2004 | Mack ..................... | B60P 3/423 296/10 |
| 2008/0174142 A1 * | 7/2008 | Pearlman .............. | B60J 7/1614 296/100.1 |
| 2010/0289291 A1 * | 11/2010 | Ting ...................... | B60J 7/1614 296/100.17 |
| 2015/0054300 A1 * | 2/2015 | Shi ......................... | B60J 7/141 296/100.09 |
| 2017/0308075 A1 * | 10/2017 | Whitaker .............. | B60W 10/18 |
| 2018/0118005 A1 * | 5/2018 | Molinar Olivas ..... | B60J 7/1614 |
| 2018/0339578 A1 * | 11/2018 | Sullivan .................... | B60J 7/12 |
| 2019/0061497 A1 * | 2/2019 | Trinier .................... | B60J 7/198 |

* cited by examiner

*Primary Examiner* — Jason S Daniels
(74) *Attorney, Agent, or Firm* — Invention To Patent Services; Alex Hobson

(57) ABSTRACT

A tonneau cover lift; the tonneau cover lift includes a height-adjustable, lightweight tonneau cover assembly including a cover member and a rectangular frame supported by four telescoping, hydraulic support posts including a first-telescopic-leg, a second-telescopic-leg, a third-telescopic-leg, and a fourth-telescopic-leg. The cover member is sized and configured to cover a bed of a truck and may be remotely controlled using a remote activation unit. The tonneau cover lift expands a protected cargo capacity of a truck.

17 Claims, 6 Drawing Sheets

TONNEAU COVER LIFT

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of truck accessories of existing art and more specifically relates to tonneau covers.

RELATED ART

Trucks are utilized for several purposes including transporting items within a truck bed. Typically, truck beds are exposed to sunlight, heat, wind, and rain, which may damage goods or cargo in it. Therefore, truck bed covers are used in order to shield and protect the cargo. A variety of structures and mechanisms have been developed for covering the truck bed area. Unfortunately, existing tonneau covers, camper shells, bed covers, etc. only provide limited storage capacity and gear protection. Additionally, removing an existing cover in order to access contents of the bed of the truck requires at a minimum manual labor and often it requires tools and several people to help. This is time consuming and inconvenient. A suitable solution is desired.

U.S. Pat. No. 6,799,787 to Mark M. Angelos relates to a transformable truck bed cover. The described transformable truck bed cover includes a transformable truck bed cover that mounts on a pickup truck having an open bed. The cover assembly is transformable in height between a tonneau cover-like configuration and a fully elevated truck cap-like configuration. The cover assembly is also transformable in length between a fully retracted position extending over the open bed only a few inches behind the truck's cab to a fully extended position covering the entire length of the bed. The cover assembly generally comprises two anchoring rails fixedly attached to the sides of the truck bed, and two or more articulated cover support assemblies, extending across the bed, with an attached flexible cover assembly. The support assemblies are pivotally secured to the anchoring rails such that they may be pivoted upward to form a cap-shaped covering. The cover support assemblies are also slidably attached to the anchoring rails such that the flexible cover may be extended or retracted, in an accordion-like fashion, along the truck bed's length. Transformation between any of the various height or length configurations may be accomplished manually or automatically.

SUMMARY OF THE INVENTION

In view of the foregoing disadvantages inherent in the known tonneau cover art, the present disclosure provides a novel tonneau cover lift. The general purpose of the present disclosure, which will be described subsequently in greater detail, is to provide an effective and efficient tonneau cover lift.

A tonneau cover lift is disclosed herein. The tonneau cover lift includes a cover assembly comprising a cover member sized and configured to cover a bed of a truck, a rectangular frame supporting the cover member, a first-telescopic-leg, a second-telescopic-leg, a third-telescopic-leg, a fourth-telescopic-leg, a plurality of side-walls, and a remote activation unit provided for activation of and remotely controlling the cover assembly. The first-telescopic-leg, the second-telescopic-leg, the third-telescopic-leg, and the fourth-telescopic-leg each include mounting brackets for mounting the cover assembly on the bed of the truck. The first-telescopic-leg, the second-telescopic-leg, the third-telescopic-leg, and the fourth-telescopic-leg are in communication with the remote activation unit which is configured to activate and control movement of the cover assembly between a closed-condition and an open-condition.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a tonneau cover lift, constructed and operative according to the teachings of the present disclosure.

The various embodiments of the present invention will hereinafter be described in conjunction with the appended drawings, wherein like designations denote like elements.

DETAILED DESCRIPTION

Figure 1:
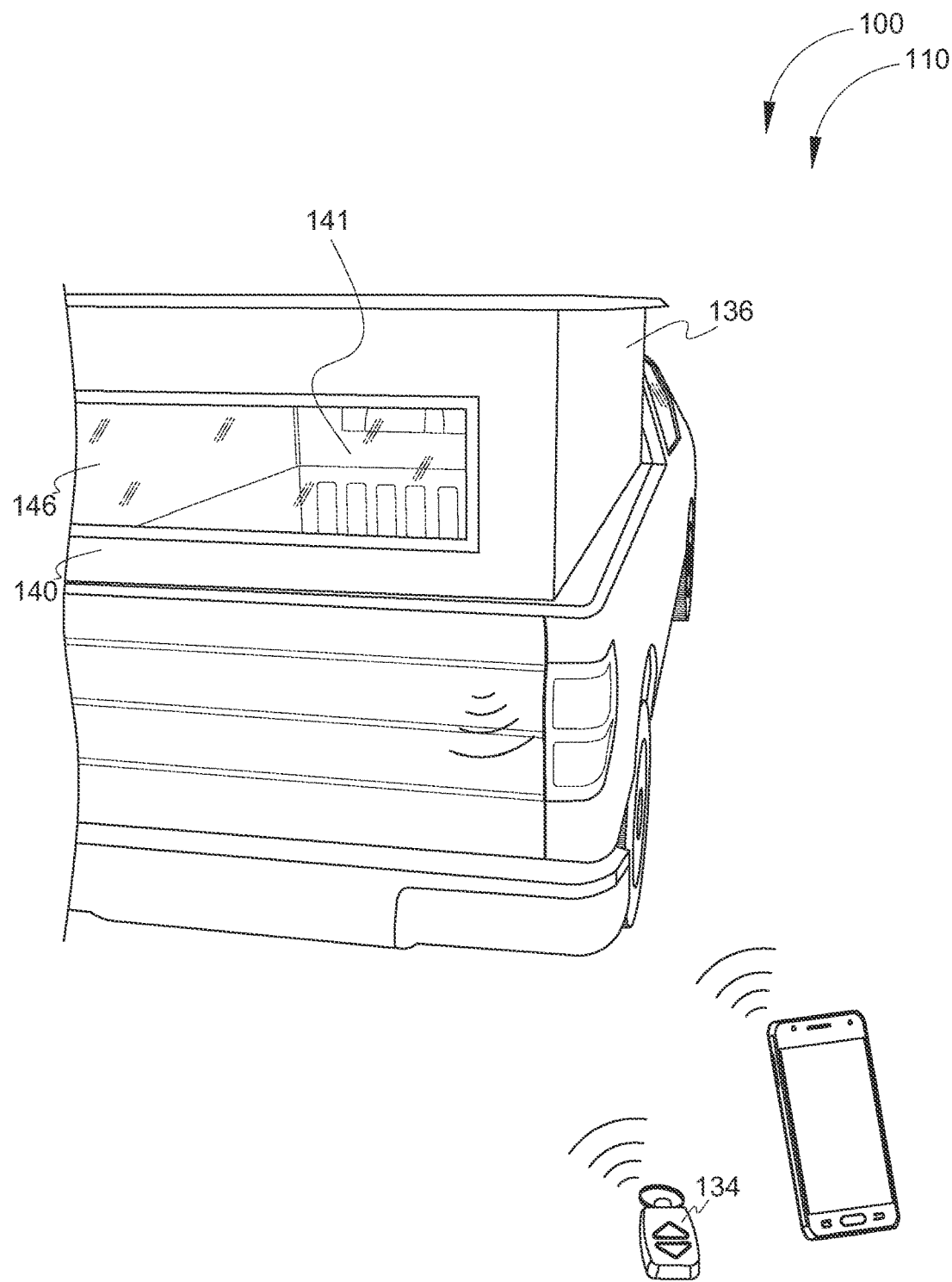
FIG. 1 is a perspective view of the tonneau cover lift during an 'in-use' condition, according to an embodiment of the disclosure.

As discussed above, embodiments of the present disclosure relate to a tonneau cover and more particularly to a tonneau cover lift as used to improve the storage and protection of items stored within a bed of a truck.

Generally, the tonneau cover lift includes a height-adjustable, lightweight tonneau cover with adjustable side panels that can be raised when cargo exceeds the height of its hosting bed. The side panels of the tonneau cover lift protect and shield cargo when the rectangular frame is raised. The tonneau cover lift includes a cover member and a rectangular frame supported by four telescoping support posts including a first-telescopic-leg, a second-telescopic-leg, a third-telescopic-leg, and a fourth-telescopic-leg. A motor is included for raising the support posts. Removable sidewalls of pliant material attach to the aforementioned rectangular frame and may include translucent segments of material.

In a preferred embodiment, the rectangular frame of the tonneau cover lift is made of aluminum and comprises a substantially similar length and width to that of a cargo bed of a truck. Each length segment and one (1) width segment of the frame host a spring-loaded axle, and on each of these three (3) axles is a sheet of pliable tarpaulin. Fasteners are included at the hemline of the open plane of each sheet. This width-segment features a transparent window, made of craft plastic, strategically positioned to align with the rear cabin window of the hosting vehicle when fully extended. A free axle is hosted on the remaining width segment of the frame and hosts a sheet of pliable tarpaulin. This width-segment tarpaulin features a transparent window, made of craft plastic, strategically positioned to align with the rear cabin window of the hosting vehicle when fully extended. A magnetic lining is included on the hemline of the open plane.

Projecting from corner portions of the rectangular frame are four telescoping support posts including a first-telescopic-leg, a second-telescopic-leg, a third-telescopic-leg, a fourth-telescopic-leg. The support posts of the tonneau cover lift may expand by various means, such as but not limited to electric motor, hydraulics, pneumatics, and manual operation. The support posts end with mounting brackets that attach to a floor-portion of the bed by bolts. A battery-powered motor connects by wire to each support post. Additionally, wiring extending from the motor leads to a power button, which can be mounted in the bed or cabin of the hosting vehicle. A signal receiver is also included in the motor for its activation by included remote control device, as well as by smartphone that hosts the individual app aligned with this signal receiver.

The tonneau cover lift may be produced in formats to accommodate coupe utility vehicles and/or utility trailers. In other embodiments, the tonneau cover lift may be adapted to fit on flatbed towable trailers. An original-equipment variation of the tonneau cover lift may feature solid plane walls that are contained within, and rise from, the sidewalls and tailgate of the hosting vehicle. The tonneau cover lift may further include a flooring panel.

A method of use is as follow: the tonneau cover lift may be applied to a bed of a hosting truck using necessary mounting-fasteners. A user may raise and lower the tonneau cover lift by use of its power button, remote control, or mobile application. With use of the tonneau cover lift cargo can be safely transported without risk of exposure to elements, without risk of accidentally falling from the cargo bed, and without risk of damages, accidents, and injuries from such falls. Additionally, by shielding cargo from plain view the tonneau cover lift can significantly reduce instances of theft.

Referring now more specifically to the drawings by numerals of reference, there is shown in FIGS. 1-6, various views of a tonneau cover lift 100.

FIG. 1 shows a tonneau cover lift 100 during an 'in-use' condition, according to an embodiment of the present disclosure. Here, the tonneau cover lift 100 may be beneficial for use by a user to ensure that all contents of a bed 5 of a truck 10 remain protected and enclosed even when a height of the contents exceed a cargo bed wall height. As illustrated, the tonneau cover lift 100 may comprise a cover assembly 110 including a cover member 112 sized and configured to cover a bed 5 of a truck 10, a rectangular frame 114 supporting the cover member 112, a first-telescopic-leg 116, a second-telescopic-leg 118, a third-telescopic-leg 120, a fourth-telescopic-leg 122, a plurality of sidewalls 124, and a remote activation unit 126 provided for activation of and remotely controlling the cover assembly 110. The tonneau cover lift 100 expands a protected cargo capacity of a truck 10.

The first-telescopic-leg 116, the second-telescopic-leg 118, the third-telescopic-leg 120, and the fourth-telescopic-leg 122 each include mounting brackets 128 for mounting the cover assembly 110 on the bed 5 of the truck 10. The first-telescopic-leg 116, the second-telescopic-leg 118, the third-telescopic-leg 120, and the fourth-telescopic-leg 122 are in communication with the remote activation unit 126. The remote activation unit 126 may be used to activate and control movement of the cover assembly 110 between a closed-condition and an open-condition.

The first-telescopic-leg 116, the second-telescopic-leg 118, the third-telescopic-leg 120, and the fourth-telescopic-leg 122 are preferably motor driven. The first-telescopic-leg 116, the second-telescopic-leg 118, the third-telescopic-leg 120, and the fourth-telescopic-leg 122 each comprise a motor 130 configured to raise and lower the cover assembly 110 in relation to the bed 5 of the truck 10 when activated. The motor 130 of the first-telescopic-leg 116, the second-telescopic-leg 118, the third-telescopic-leg 120, and the fourth-telescopic-leg 122 is battery-powered and connected to a respective one of the first-telescopic-leg 116, the second-telescopic-leg 118, the third-telescopic-leg 120, and the fourth-telescopic-leg 122 via wiring. The remote activation unit 126 may include a mountable button 132 and a key fob 134. The mountable button 132 may be mounted in a vehicle-cabin or outside a vehicle and may be directly wired to an electric system of the host-vehicle. Additionally, a mobile application is provided which is downloadable to and hosted on a smartphone having a user-display.

Figure 2:
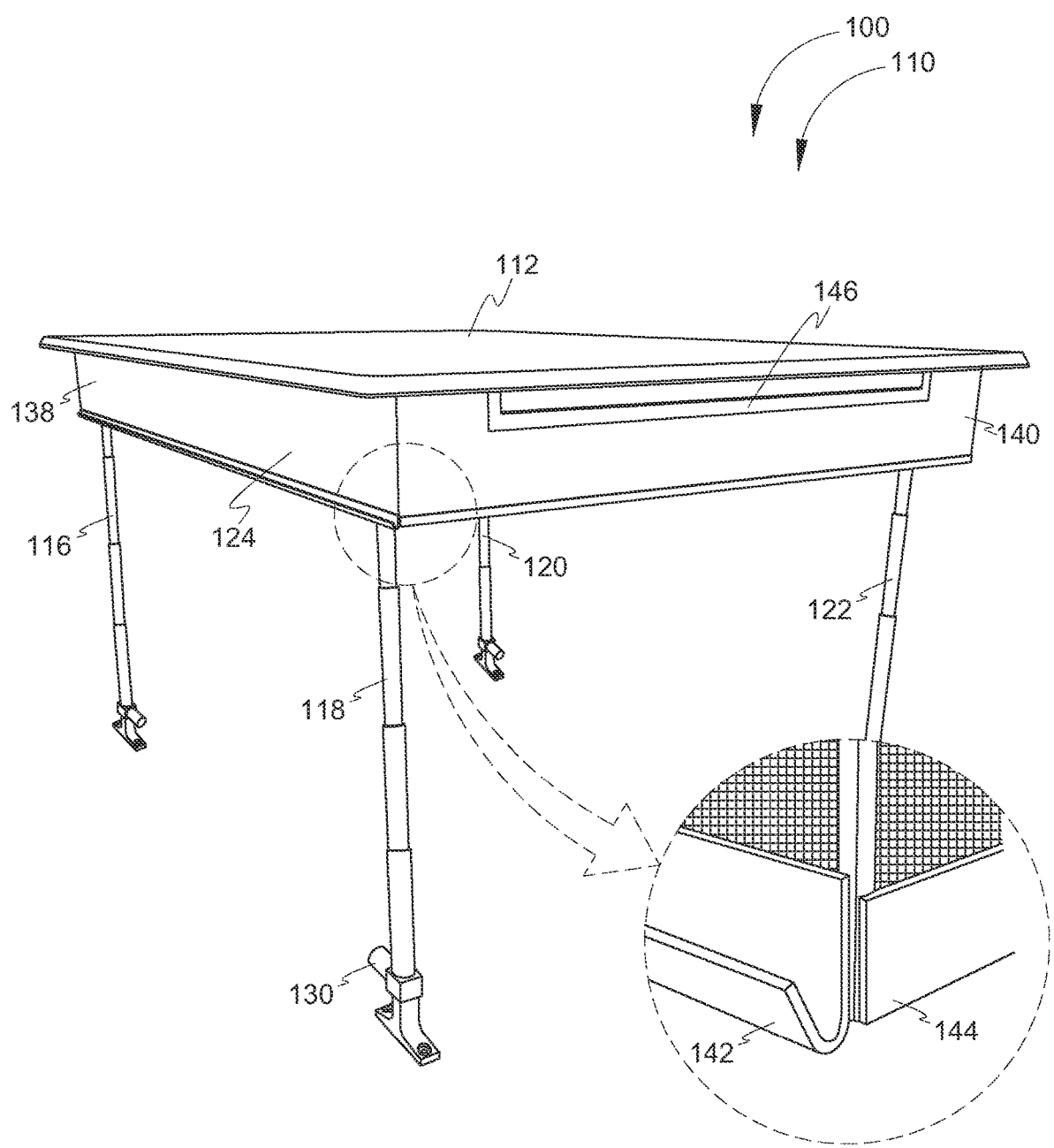
FIG. 2 is a perspective view of the tonneau cover lift in an extended 'open-condition' of FIG. 1, according to an embodiment of the present disclosure.

FIG. 2 shows a perspective view of the tonneau cover lift 100 in an extended 'open-condition' of FIG. 1, according to an embodiment of the present disclosure. The plurality of sidewalls 124 of the cover assembly 110 are flexible and in a preferred embodiment comprise a sheet of weatherproof tarpaulin material. The plurality of sidewalls 110 include a right-side-panel 136, a left-side-panel 138, a front-panel 141, and a rear-panel 140. During an installed condition, the right-side-panel 136 is positioned along a ride-side of a vehicle, the left-side-panel 138 is positioned along a left-side of a vehicle, and the rear-panel 140 is positioned along a tailgate of a vehicle.

The plurality of sidewalls 110 are retractable and hosted upon spring loaded rollers. The plurality of sidewalls 110 further include fasteners for securing the plurality of sidewalls 110 to the bed 5 of the truck 10 during use. The fasteners are positioned on an open plane of each of the plurality of sidewalls 110 and are configured to secure the plurality of sidewalls 110 to the bed 5 of the truck 10 for use. The right-side-panel 136 and the left-side-panel 138 each include a sidewall hook 142. The rear-panel 140 and front-panel 141 each comprise a magnetic-fastener 144 and further include a transparent window 146. The transparent windows 146 are in alignment with a rear cabin window of the truck 10 when in a fully extended condition. Throughout transport, a driver can still safely see through a rear-view mirror of the truck 10 due to the transparent window 146.

Figure 3:
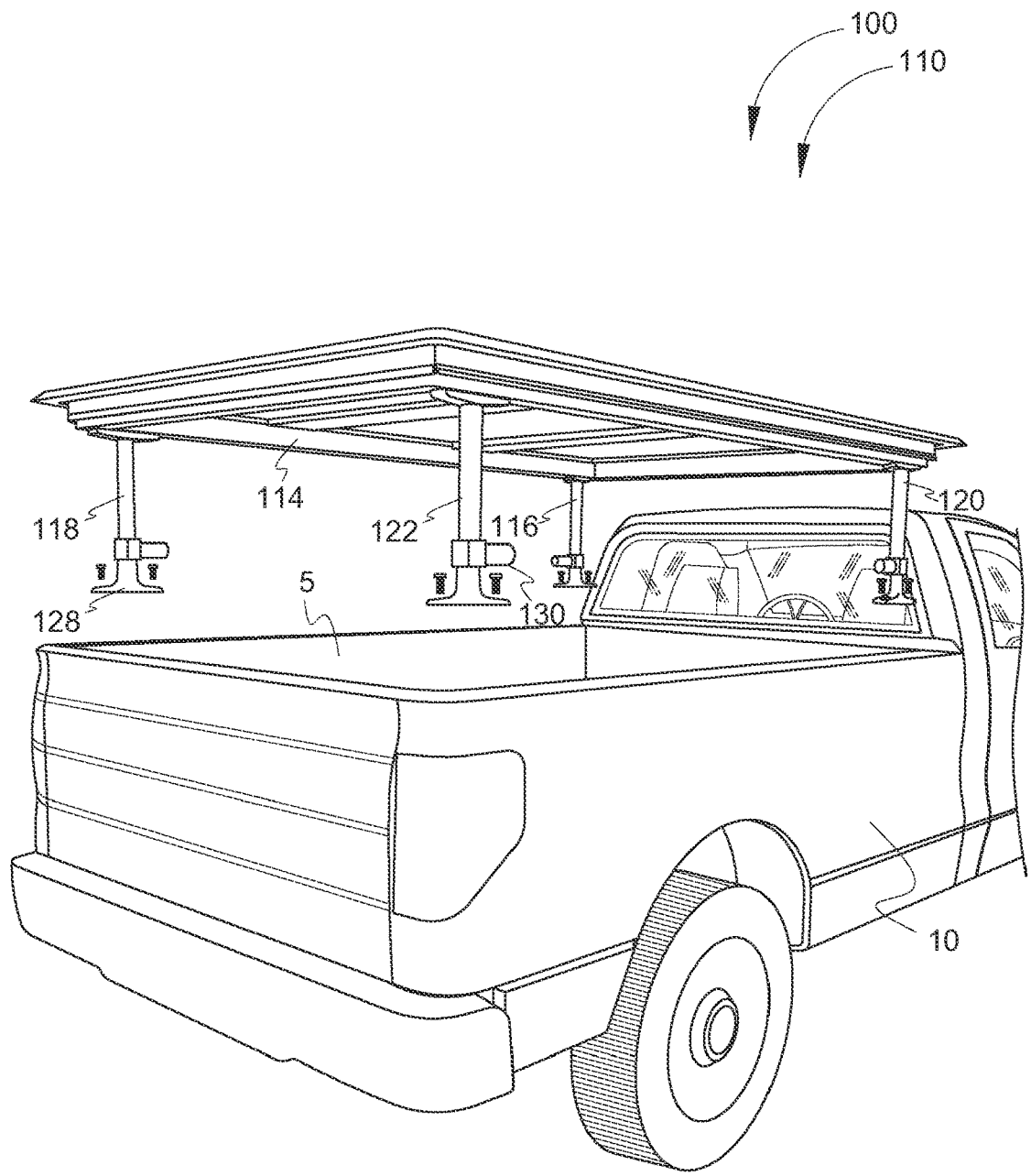
FIG. 3 is a perspective view of the tonneau cover lift of FIG. 1, according to an embodiment of the present disclosure.

FIG. 3 is a perspective view of the tonneau cover lift 100 of FIG. 1, according to an embodiment of the present disclosure. The plurality of sidewalls 124 of the tonneau cover lift 100 prevent cargo from falling from a bed 5 of a truck 10 during vehicle motion. Additionally, the plurality of sidewalls 124 prevent damage to cargo and exposure to elements, such as UV rays, heat, rain and road splash, during vehicle motion. The sidewalls 124 of the tonneau cover lift 100 may be made of various pliable materials applicability, such as but not limited to tarpaulin, vinyl, and waterproofed canvas.

Figure 4:
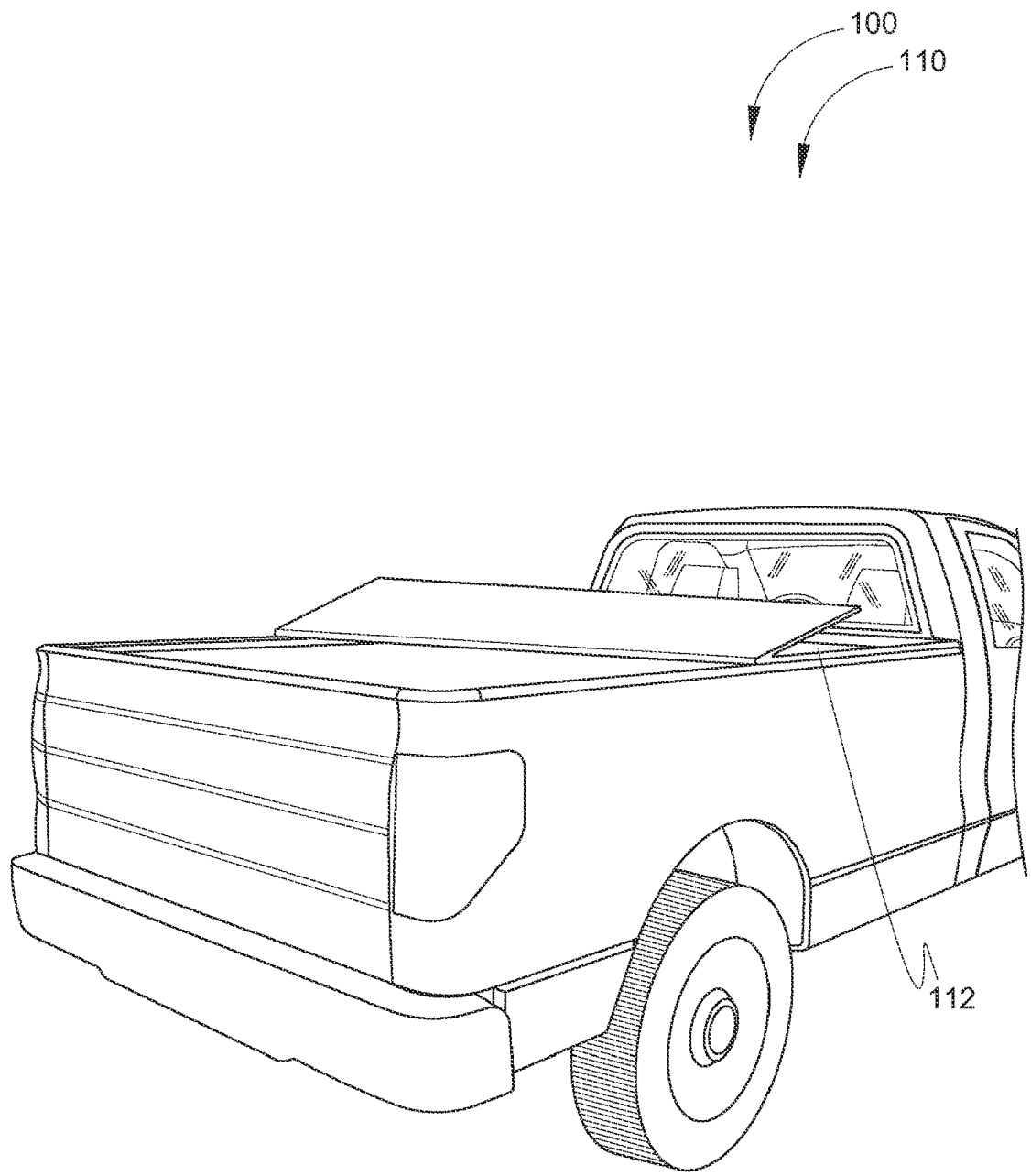
FIG. 4 is a perspective view of the tonneau cover lift of FIG. 1, according to an embodiment of the present disclosure.

As shown in FIG. 4, the cover member 112 is foldable and comprises a tri-fold planar body in a preferred embodiment. The cover member 112 may be composed of a various number of segments, and which may attach to each other by various means. Additionally, the cover member 112 may be made in various tonneau formats, such as but not limited to tri-fold, hinged, and retractable. The cover member 112 may be removable from the rectangular frame 114. In yet other embodiments, the cover member 112 may be a fabric tonneau cover, hosted on a retractable cylinder. Various fabrics of applicability, such as but not limited to tarpaulin and waterproofed canvas, may be used in said variations. The cover member 112 of the tonneau cover lift 100 may comprise various materials, including but not limited to fiberglass, high density polyethylene (HDPE), and aluminum. The tonneau cover lift 100 may be made in various specific sizes and shapes to fit within the bed 5 of specific makes and models of trucks 10 and coupe utility vehicles. The rectangular frame 114 of the tonneau cover lift 100 may be made of various materials of applicability, including but not limited to aluminum, aluminum alloy, and stainless steel.

Figure 5:
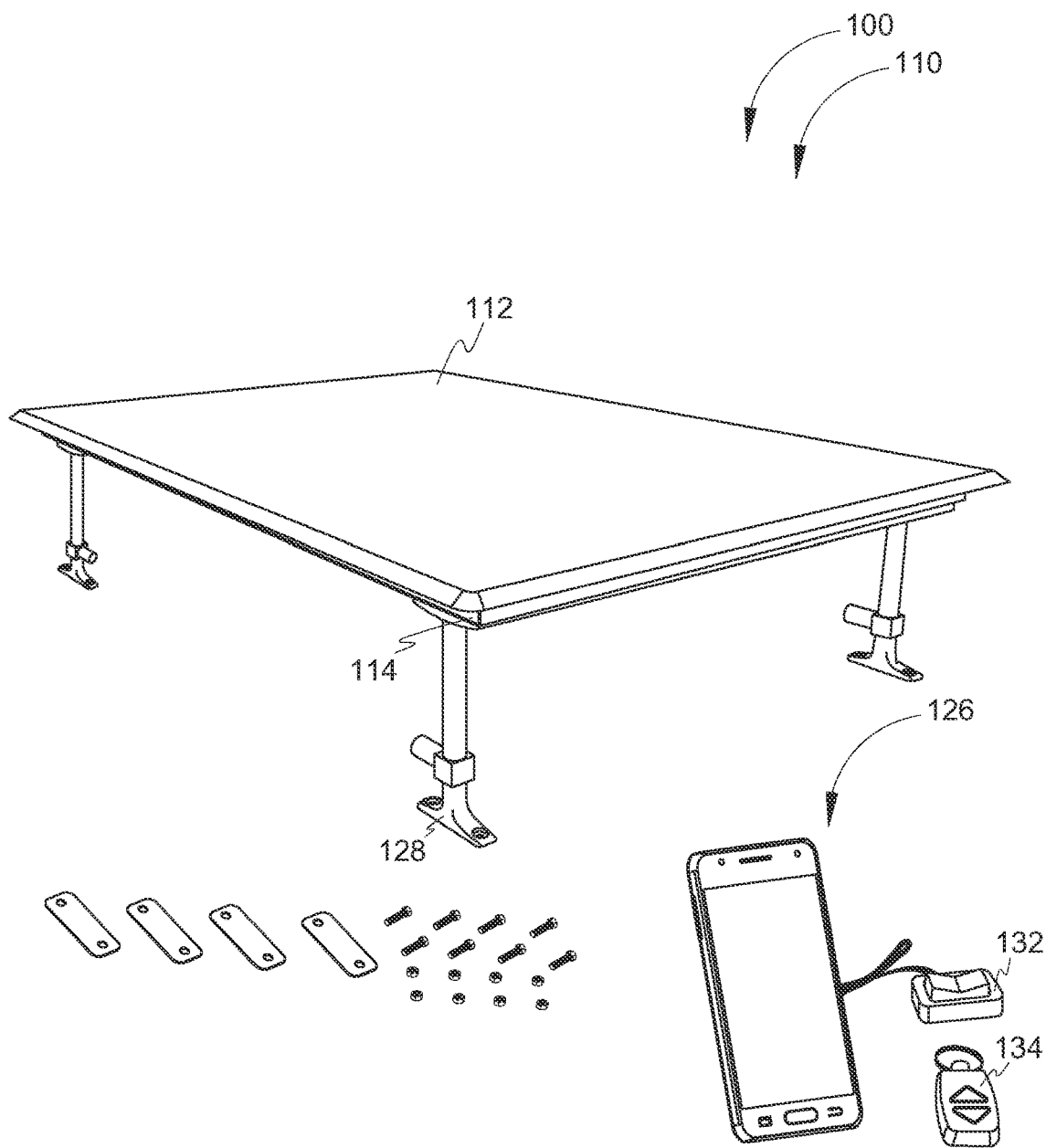
FIG. 5 is a perspective view of the tonneau cover lift of FIG. 1, according to an embodiment of the present disclosure.

FIG. 5 is a perspective view of the tonneau cover lift 100 of FIG. 1, according to an embodiment of the present disclosure. As illustrated, the cover assembly 110 comprises the cover member 112, the rectangular frame 114, the first-telescopic-leg 116, the second-telescopic-leg 118, the third-telescopic-leg 120, the fourth-telescopic-leg 122, the plurality of sidewalls 124, and the remote activation unit 126. The tonneau cover lift 100 increases storage capacity of a hosting bed 5 of a truck 10 allowing the bed 5 to host more items.

Figure 6:
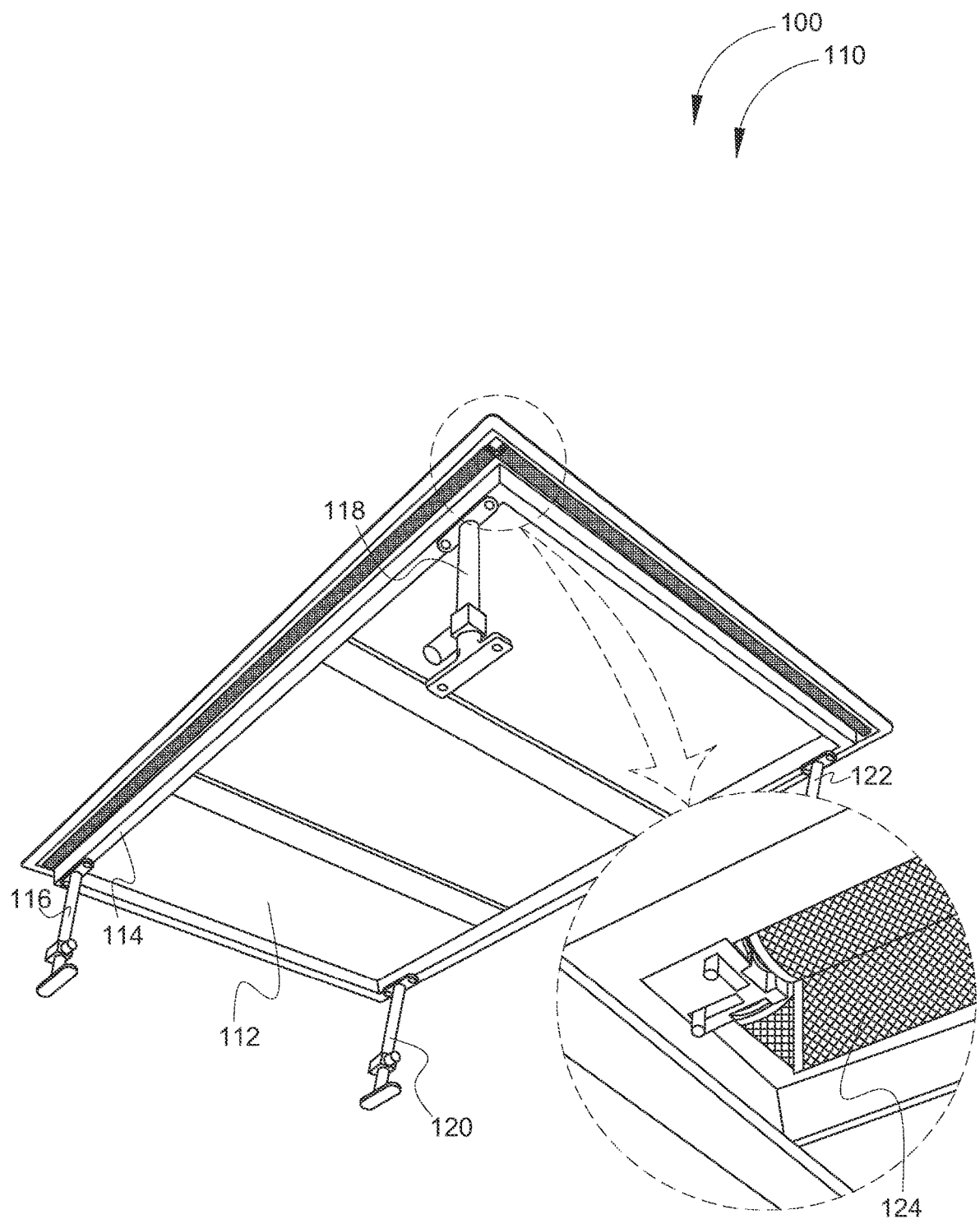
FIG. 6 is a bottom perspective view of the tonneau cover lift of FIG. 1, according to an embodiment of the present disclosure.

FIG. 6 a bottom perspective view of the tonneau cover lift 100 of FIG. 1, according to an embodiment of the present disclosure. As shown, the plurality of sidewalls 124 are hosted upon spring-loaded rollers. The spring-loaded rollers may be removable from the rectangular frame 114.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A tonneau cover lift, the tonneau cover lift comprising:
   a cover assembly including;
      a cover member sized and configured to cover a bed of a truck;
      a rectangular frame supporting said cover member;
      a first-telescopic-leg;
      a second-telescopic-leg;
      a third-telescopic-leg;
      a fourth-telescopic-leg;
      a plurality of sidewalls; and
      a remote activation unit provided for activation of and remotely controlling said cover assembly;
   wherein said first-telescopic-leg, said second-telescopic-leg, said third-telescopic-leg, and said fourth-telescopic-leg each include mounting brackets for mounting said cover assembly on said bed of said truck;
   wherein said first-telescopic-leg, said second-telescopic-leg, said third-telescopic-leg, and said fourth-telescopic-leg are in communication with said remote activation unit, said remote activation unit activating and controlling movement of said cover assembly between a closed-condition and an open-condition;
   wherein said first-telescopic-leg, said second-telescopic-leg, said third-telescopic-leg, and said fourth-telescopic-leg are motor driven and each comprise a motor configured to raise and lower said cover assembly in relation to said bed of said truck when activated;
   wherein said plurality of sidewalls are flexible and comprise a sheet of weatherproof tarpaulin material;
   wherein said plurality of sidewalls includes a right-side-panel, a left-side-panel, front-panel, and a rear-panel; and
   wherein said right-side-panel, said left-side-panel, said front-panel are retractable and hosted upon spring loaded rollers.

2. The tonneau cover lift of claim 1, wherein said remote activation unit includes a mountable button.

3. The tonneau cover lift of claim 2, wherein said remote activation unit includes a mobile application downloadable to and hosted on a smartphone having a user-display.

4. The tonneau cover lift of claim 3, wherein said remote activation unit further includes a key fob.

5. The tonneau cover lift of claim 3, wherein said mobile application is in communication with said cover assembly and configured to control expanding and retracting of said first-telescopic-leg, said second-telescopic-leg, said third-telescopic-leg, and said fourth-telescopic-leg.

6. The tonneau cover lift of claim 2, wherein said mountable button is directly wired to an electric system of said host-vehicle.

7. The tonneau cover lift of claim 1, wherein said plurality of sidewalls further include fasteners for securing said plurality of sidewalls to said bed of said truck during use.

8. The tonneau cover lift of claim 7, wherein said fasteners are positioned on an open plane of each of said plurality of side-walls and are configured to secure said plurality of side-walls to said bed of said truck for use.

9. The tonneau cover lift of claim 8, wherein said right-side-panel and said left-side-panel each include a sidewall hook.

10. The tonneau cover lift of claim 9, wherein said front-panel and said rear-panel each comprise a magnetic-fastener.

11. The tonneau cover lift of claim 10, wherein said front-panel and said rear-panel each further include a transparent window.

12. The tonneau cover lift of claim 11, wherein said transparent windows are in alignment with a rear cabin window of said truck when in a fully extended condition.

13. The tonneau cover lift of claim 1, wherein said motor of said first-telescopic-leg, said second-telescopic-leg, said third-telescopic-leg, and said fourth-telescopic-leg is battery-powered and connected to a respective one of said first-telescopic-leg, said second-telescopic-leg, said third-telescopic-leg, and said fourth-telescopic-leg via wiring.

14. The tonneau cover lift of claim 1, wherein said spring loaded rollers are removable from said rectangular frame.

15. The tonneau cover lift of claim 1, wherein said cover member is foldable and comprises a tri-fold planar body.

16. The tonneau cover lift of claim 15, wherein said cover member is removable from said rectangular frame.

17. A tonneau cover lift, the tonneau cover lift comprising:
   a cover assembly including;
     a cover member sized and configured to cover a bed of a truck;
     a rectangular frame supporting said cover member;
     a first-telescopic-leg;
     a second-telescopic-leg;
     a third-telescopic-leg;
     a fourth-telescopic-leg;
     a plurality of sidewalls; and
     a remote activation unit provided for activation of and remotely controlling said cover assembly;
   wherein said first-telescopic-leg, said second-telescopic-leg, said third-telescopic-leg, and said fourth-telescopic-leg each include mounting brackets for mounting said cover assembly on said bed of said truck;
   wherein said first-telescopic-leg, said second-telescopic-leg, said third-telescopic-leg, and said fourth-telescopic-leg are in communication with said remote activation unit, said remote activation unit activating and controlling movement of said cover assembly between a closed-condition and an open-condition;
   wherein said first-telescopic-leg, said second-telescopic-leg, said third-telescopic-leg, and said fourth-telescopic-leg are motor driven and each comprise a motor configured to raise and lower said cover assembly in relation to said bed of said truck when activated;
   wherein said remote activation unit includes a mountable button, key fob, and a mobile application hosted on a smartphone;
   wherein said mobile application is in communication with said cover assembly and configured to control expanding and retracting of said first-telescopic-leg, said second-telescopic-leg, said third-telescopic-leg, and said fourth-telescopic-leg;
   wherein said plurality of sidewalls are flexible and comprise a sheet of weatherproof tarpaulin material;
   wherein said plurality of sidewalls includes a right-side-panel, a left-side-panel, front-panel, and a rear-panel;
   wherein said right-side-panel, said left-side-panel, and said front-panel are retractable and hosted upon spring loaded rollers;
   wherein said plurality of sidewalls further include fasteners for securing said plurality of sidewalls to said bed of said truck during use;
   wherein said fasteners are positioned on an open plane of each of said plurality of sidewalls and are configured to secure said plurality of sidewalls to said bed of said truck for use;
   wherein said right-side-panel and said left-side-panel each include a sidewall hook;
   wherein said front-panel and said rear-panel each comprise a magnetic-fastener;
   wherein said front-panel and said rear-panel each further include a transparent window;
   wherein said transparent windows are each in alignment with a rear cabin window of said truck when in a fully extended condition;
   wherein said first-telescopic-leg, said second-telescopic-leg, said third-telescopic-leg, and said fourth-telescopic-leg are hydraulicly operated;
   wherein said spring loaded rollers are removable from said rectangular frame;
   wherein said motor of said first-telescopic-leg, said second-telescopic-leg, said third-telescopic-leg, and said fourth-telescopic-leg is battery-powered and connected to a respective one of said first-telescopic-leg, said second-telescopic-leg, said third-telescopic-leg, and said fourth-telescopic-leg via wiring;
   wherein said mountable button is directly wired to a host-vehicle-motor;
   wherein said cover member is foldable and comprises a tri-fold planar body; and
   wherein said cover member is removable from said rectangular frame.

* * * * *